W. E. HIPKINS, DEC'D.
J. B. OARSLAKE & A. H. GIBSON, EXECUTORS.
AUTOMATIC WEIGHING APPARATUS.
APPLICATION FILED JAN. 12, 1912.
1,066,614.
Patented July 8, 1913.
2 SHEETS—SHEET 1.
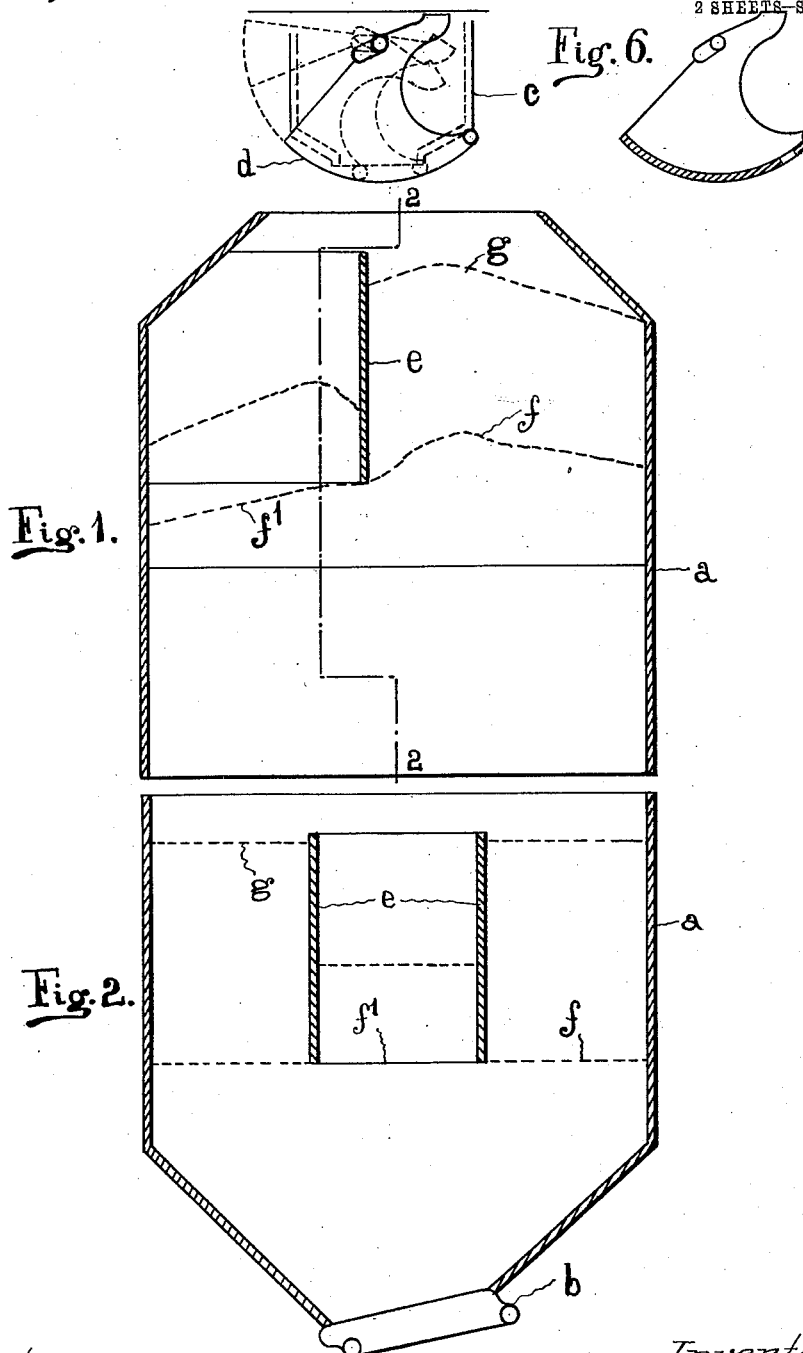
Witnesses:
Howell Bartle
Annie Cooper
Inventor:
William E. Hipkins,
By Finckel & Finckel
Attorneys.

W. E. HIPKINS, DEC'D.
J. B. CARSLAKE & A. H. GIBSON, EXECUTORS.
AUTOMATIC WEIGHING APPARATUS.
APPLICATION FILED JAN. 12, 1912.

1,066,614.

Patented July 8, 1913.
2 SHEETS—SHEET 2.

Witnesses:
Annie Cooper
Edith L. Smith.

John B. Carslake
and
Arthur H. Gibson
Executors of the Estate of
William E. Hipkins, deceased, Inventor:
by
Finckel & Finckel
Attorneys.

UNITED STATES PATENT OFFICE.

WILLIAM E. HIPKINS, OF SOHO FOUNDRY, NEAR BIRMINGHAM, ENGLAND; JOHN BARHAM CARSLAKE AND ARTHUR HENRY GIBSON, OF BIRMINGHAM, ENGLAND, EXECUTORS OF SAID HIPKINS, DECEASED.

AUTOMATIC WEIGHING APPARATUS.

1,066,614. Specification of Letters Patent. Patented July 8, 1913.

Application filed January 12, 1912. Serial No. 670,805.

*To all whom it may concern:*

Be it known that I, WILLIAM EDWARD HIPKINS, a subject of the King of Great Britain and Ireland, residing at Soho Foundry, near Birmingham, in the county of Stafford, England, have invented certain new and useful Improvements in Automatic Weighing Apparatus, of which the following is a specification.

This invention has reference to improvements in automatic weighing apparatus for weighing granular or like material.

The object of the invention is to obtain more accurate weighments by this class of apparatus, and has particular reference to a means of insuring a definite length of flow for the reduced or dribble feed after the main feed has cut off, irrespective of the material and its specific gravity, which is being weighed.

The invention comprises the fixing in the weigh hopper of a plate or partition arranged in the hopper, said plate or partition being positioned in such manner that the main supply or feed of material shall be directed on one side thereof and the reduced or dribble supply or feed on the opposite side, the plate in one construction extending to, and being connected with, two opposite sides of the weigh hopper. This plate or partition extends downwardly into the weigh hopper for a suitable distance say approximately one third of the depth of the weigh hopper, regulated by the purpose and use of the apparatus; but the bottom edge of the plate or partition must at each weighment and for any given material be below the surface or head of the material delivered from the main feed when this supply is cut off. Said plate or partition may also if desired be adjustable in position either or both vertically and horizontally.

A form of the said invention is illustrated by the accompanying drawings wherein like letters have reference to like parts.

Figure 3:
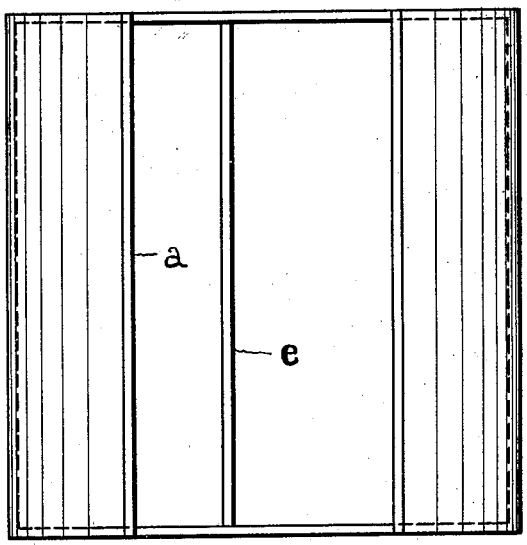
Figure 4:
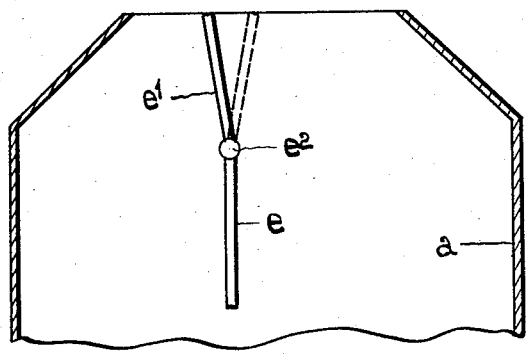
Figure 5:
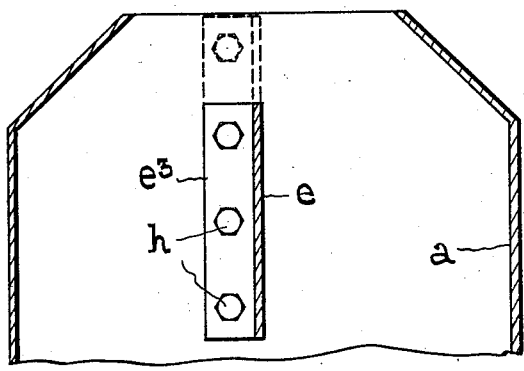

Figure 1 is a sectional elevation of a weigh hopper showing my invention applied thereto, above the weigh hopper being illustrated the outlet of the supply chute and the control gate thereof. Fig. 2 is a cross sectional elevation of the weigh hopper being taken on line 2—2 Fig. 1. Fig. 3 is a plan of modified construction of weigh hopper, wherein the plate or partition $e$ extends completely across the hopper. Fig. 4 is a part sectional elevation of a weigh hopper, illustrating a partition having a hinged or adjustable part $e'$ hinged at $e^2$. Fig. 5 is a part sectional elevation of a vertically adjustable partition $e$, having the ends $e^3$ thereof bent at right angles, and secured to the sides of the weigh hopper by means of bolts $h$. Fig. 6 is a view of the supply gate illustrating the dribble outlet through which the material is fed in the dribble position of the gate shown in Fig. 1.

The weigh hopper $a$ is suspended from the weigh beam, steelyard or the like in known manner and has an outlet gate $b$. Above the hopper is the supply chute $c$ from the elevator or other source of feed, having the outlet control gate $d$, these elements being of known form and operate in the ordinary manner.

My invention resides in the partitioning plate or bottomless box or receptacle $e$ positioned within the weigh hopper substantially as shown whereby the main supply of grain is directed to one side thereof and the dribble or reduced supply is directed into the receptacle formed by the said plate or plates $e$. An essential factor in the positioning of this plate or plates $e$ is that the bottom edge thereof must be below the head or surface of the main supply of grain or other material being weighed at the time of the cut off. This is illustrated by the grain line $f$ where it will be seen that the head of grain is above the bottom edge of the plate $e$. It must also be understood that the plate $e$ extends sufficiently upward to be above the head or surface of the largest bulk of main supply or material as for instance as illustrated by the grain line $g$. The use of this plate or bottomless box or receptacle formed thereby in operation being as follows:—The graular material to be weighed is first fed or supplied from what is generally known and termed the main feed, which is supplied and directed on one side of the plate or partition $e$, filling first the bottom of the weigh hopper across its whole area and finally before cutting off rising above the bottom edge of the plate $e$ as illustrated by the lines $f$ or $g$. It will now be seen that part of the graular material owing to its inability to flow upward has created a base or bottom for the section or partition of the hopper formed by the plate or plates e, forming in effect a box or receptacle having an open top. When the main feed or supply has cut off the reduced or dribble supply commences and is directed into the said box or partition of the weigh hopper. The said reduced or dribble supply continuing until the weight is complete in ordinary known manner.

It will be seen from the foregoing description that the distance from the outlet of the supply chute c to the surface f' of the granular material forming the bottom or base of the dribble box or partition is automatically determined by the material forming the main feed and the bottom edge of the plate e, consequently insuring greater accuracy of weighment in apparatus of this type.

The construction of my invention shown in the accompanying drawings represents one form only and the construction may depart therefrom so long as the essential features enumerated are embodied. As an example the plate e as seen in Fig. 1 may extend completely across the weigh hopper instead of terminating in side plates as seen by e Fig. 2, such a construction being equally effective.

It should be observed that so long as the surface of the supply forming the main feed of the granular material in the weigh hopper is above the bottom edge of the plate or partition e before the dribble supply commences it will not affect the height of the surface area of material f' forming the bottom of said dribble box or partition, and such height is not affected by the amount the main supply is above the bottom edge of the plate or partition e. As an example the grain line f' will be the same whether the main supply finishes at f or g.

The application of this invention is not limited to any one type of automatic weighing apparatus and further it may be used in combination with other known devices for insuring greater accuracy in the weighments obtained by such apparatus.

What I claim is:—

1. In automatic weighing apparatus the combination with the weigh hopper of a partition therein forming a division of the hopper through part of its depth, adapted to receive the main supply of material on one side thereof and the reduced or dribble supply on the opposite side thereof.

2. In automatic weighing apparatus, the combination with the weigh hopper of a bottomless compartment or receptacle extending from or near the inlet thereof toward the outlet, said compartment being so positioned within the weigh hopper and below the supply inlet, that the main supply is received exterior to said compartment and the reduced or dribble supply within the said compartment.

3. In automatic weighing apparatus, the combination with the weigh hopper having a compartment therein, said compartment having as a base when the main supply of material is delivered to the weigh hopper an area of the said material, the dribble or reduced feed being received within said compartment and initially on said area of material, said weigh hopper having a common outlet for the material from said compartment and the hopper proper.

4. In automatic weighing apparatus the means for determining the length of the reduced or dribble column of material between the supply outlet comprising in combination with the weigh hopper of a partition forming a division of said weigh hopper extending downwardly through the part of the depth of said hopper and having as a base an area of the material forming the main supply, whereon the said reduced or dribble supply is initially received, said division and the remainder of the weigh hopper having one common outlet or delivery gate.

5. In automatic weighing apparatus, the combination with the weigh hopper, of an adjustable partition forming a division of the hopper through part of its depth, said hopper adapted to receive the main supply of material on one side of said partition and the reduced or dribble supply on the opposite side thereof.

In testimony whereof I affix my signature in presence of two witnesses.

WILLIAM E. HIPKINS.

Witnesses:
GEORGE E. FOLKES.
WALTER MOSELEY.

Copies of this patent may be obtained for five cents each, by addressing the "Commissioner of Patents, Washington, D. C."